(12) United States Patent
Zheng et al.

(10) Patent No.: US 9,597,860 B2
(45) Date of Patent: Mar. 21, 2017

(54) CONTAINER WITH HIGH MOISTURE BARRIER PROPERTIES AND A RECLOSABLE POUR SPOUT

(71) Applicant: EVERGREEN PACKAGING, INC., Memphis, TN (US)

(72) Inventors: Yong Zheng, Cary, SC (US); Roderick W Kalberer, Waynesville, NC (US); Celso S Martinez, Collierville, TN (US); Bruce Bitowft, Memphis, TN (US); Jeffrey M Kalman, Cleveland Heights, OH (US); Todd Midkiff, Noblesville, IN (US); Jason S Andrews, Indianapolis, IN (US); Andrew B. Mendenhall, Mooresville, IN (US)

(73) Assignee: EVERGREEN PACKAGING, INC., Memphis, TN (US)

( * ) Notice: Subject to any disclaimer, the term of this patent is extended or adjusted under 35 U.S.C. 154(b) by 400 days.

(21) Appl. No.: 13/896,806

(22) Filed: May 17, 2013

(65) Prior Publication Data
US 2013/0309515 A1 Nov. 21, 2013

Related U.S. Application Data

(60) Provisional application No. 61/648,152, filed on May 17, 2012.

(51) Int. Cl.
| B32B 27/10 | (2006.01) |
| B32B 29/00 | (2006.01) |
| B32B 27/18 | (2006.01) |
| B32B 7/12 | (2006.01) |
| B32B 27/32 | (2006.01) |
| B32B 27/08 | (2006.01) |
| B65D 5/72 | (2006.01) |
| B65D 17/50 | (2006.01) |
| B29C 47/00 | (2006.01) |
| B29C 47/02 | (2006.01) |
| B29C 47/06 | (2006.01) |
| B65D 5/74 | (2006.01) |
| B29K 23/00 | (2006.01) |
| B29C 47/88 | (2006.01) |

(52) U.S. Cl.
CPC .......... B32B 27/10 (2013.01); B29C 47/0019 (2013.01); B29C 47/025 (2013.01); B29C 47/065 (2013.01); B32B 7/12 (2013.01); B32B 27/08 (2013.01); B32B 27/18 (2013.01); B32B 27/32 (2013.01); B32B 29/00 (2013.01); B65D 5/727 (2013.01); B65D 5/746 (2013.01); B65D 17/506 (2013.01); B29C 47/8845 (2013.01); B29C 2947/92714 (2013.01); B29C 2947/92942 (2013.01); B29K 2023/065 (2013.01); B29K 2023/0633 (2013.01); B29K 2023/12 (2013.01); B32B 2307/31 (2013.01); B32B 2307/4026 (2013.01); B32B 2307/704 (2013.01); B32B 2307/7246 (2013.01); B32B 2307/7265 (2013.01); B32B 2307/734 (2013.01); B32B 2439/00 (2013.01); B32B 2439/62 (2013.01); B32B 2439/70 (2013.01); Y10T 428/31902 (2015.04)

(58) Field of Classification Search
None
See application file for complete search history.

(56) References Cited

U.S. PATENT DOCUMENTS

| 124,466 | A | 3/1872 | Widgery |
| 1,295,032 | A | 2/1919 | Hothersall |
| 2,085,200 | A | 6/1937 | Ljungstrom |
| RE21,310 | E | 12/1939 | Ljungstrom |
| 2,313,783 | A | 3/1943 | Taylor |
| D170,639 | S | 10/1953 | Hoffman |
| 3,230,135 | A | 1/1966 | Hurst |
| D250,573 | S | 12/1978 | Evangelists et al. |
| 4,279,344 | A | 7/1981 | Holloway |
| 4,416,944 | A | 11/1983 | Adur |
| 4,513,036 | A | 4/1985 | Thompson |
| 4,572,422 | A | 2/1986 | Heuberger et al. |
| 4,760,938 | A | 8/1988 | Wenger |
| 4,770,325 | A | 9/1988 | Gordon et al. |
| 4,789,575 | A | 12/1988 | Gibbons |
| D328,431 | S | 8/1992 | Skidmore et al. |
| 5,225,256 | A | 7/1993 | Marano |
| D340,642 | S | 10/1993 | Detzel et al. |
| 5,484,101 | A | 1/1996 | Hedberg |
| 5,551,600 | A | 9/1996 | Sasaki et al. |
| 5,712,006 | A | 1/1998 | Marano |

(Continued)

FOREIGN PATENT DOCUMENTS

GB 1324875 7/1973

OTHER PUBLICATIONS

PCT International Search Report and the Written Opinion of the International Searching Authority or the Declaration; dated Dec. 3, 2013.

Primary Examiner — Sheeba Ahmed
(74) Attorney, Agent, or Firm — J. Bennett Mullinax, LLC

(57) ABSTRACT

A paperboard substrate that can be used to provide a food packaging particle is provided having a water vapor barrier layer comprising HDPE in combination with a nucleating agent which is extruded on to a paperboard substrate. The resulting substrate has sufficiently good water vapor barrier when properties that dry foods such as cereals do not require a bag or inner liner as a separate moisture barrier.

11 Claims, 16 Drawing Sheets

(56) References Cited

U.S. PATENT DOCUMENTS

| | | |
|---|---|---|
| 5,829,637 A | 11/1998 | Takemura et al. |
| D433,045 S | 10/2000 | Yamano et al. |
| 6,131,804 A | 10/2000 | Julian |
| 6,131,806 A | 10/2000 | Hess et al. |
| 6,150,035 A | 11/2000 | DeFife |
| 6,227,440 B1 | 5/2001 | Hart |
| 6,228,011 B1 | 5/2001 | Takemura et al. |
| 6,273,984 B1 | 8/2001 | Bourdelais et al. |
| 7,137,524 B2 | 11/2006 | Nomula |
| D534,421 S | 1/2007 | Tanner |
| 7,195,803 B2 | 3/2007 | Andersson |
| 7,279,198 B1 | 10/2007 | Knauf |
| D556,035 S | 11/2007 | Peeters |
| 7,335,409 B2 | 2/2008 | Penttinen et al. |
| 7,344,759 B2 | 3/2008 | Pentinnen |
| D571,216 S | 6/2008 | Christian et al. |
| D586,221 S | 2/2009 | Shaikh |
| D586,656 S | 2/2009 | Mount |
| 7,888,405 B2 | 2/2011 | Gohil et al. |
| D637,074 S | 5/2011 | Maki et al. |
| D677,158 S | 3/2013 | Delaney et al. |
| 2002/0050119 A1 | 5/2002 | Gatewood |
| 2002/0053592 A1 | 5/2002 | Urtubey |
| 2005/0037162 A1 | 2/2005 | Adams |
| 2005/0211754 A1 | 9/2005 | Fulcher |
| 2006/0233980 A1 | 10/2006 | Andersson |
| 2007/0087212 A1* | 4/2007 | Iyengar .............. B32B 7/06 428/474.4 |
| 2007/0184220 A1 | 8/2007 | Cleveland |
| 2008/0006680 A1 | 1/2008 | Hernandez |
| 2009/0104830 A1 | 4/2009 | Ikeda |
| 2009/0152268 A1 | 6/2009 | Whiteman |
| 2010/0062274 A1 | 3/2010 | Leth |
| 2011/0104342 A1* | 5/2011 | Glaser ................ B32B 27/08 426/106 |
| 2011/0300391 A1 | 12/2011 | Haley |
| 2012/0189856 A1 | 7/2012 | Blok |
| 2013/0149488 A1* | 6/2013 | Chandrasekaran ....... B32B 3/30 428/99 |

* cited by examiner

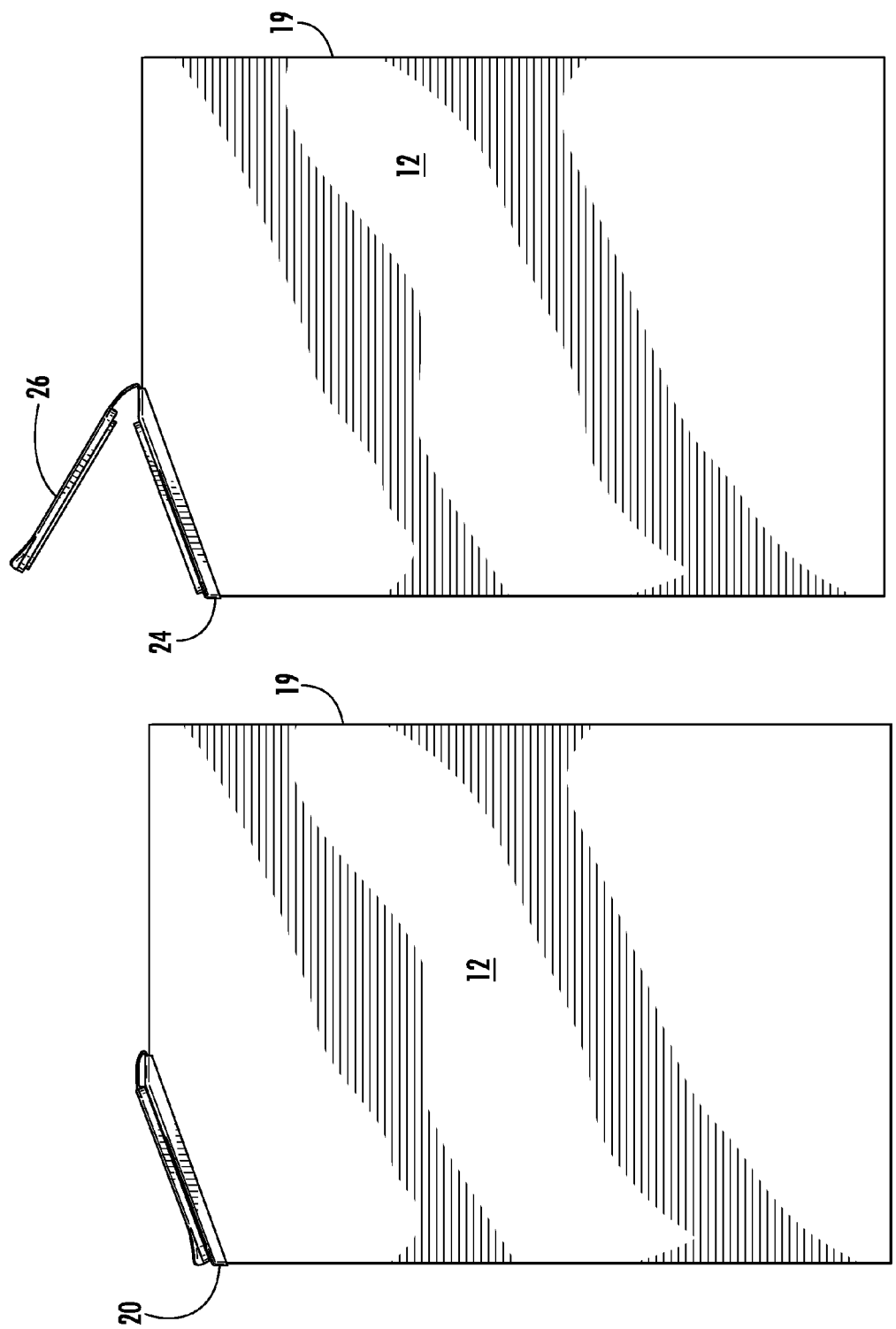

CONTAINER WITH HIGH MOISTURE BARRIER PROPERTIES AND A RECLOSABLE POUR SPOUT

CROSS REFERENCE TO RELATED APPLICATION

This application claims the benefit of U.S. Application Ser. No. 61/648,152, filed May 17, 2012 and entitled "Container With Reclosable Pour Spout"; US Design Application No. 29/422,170, filed May 17, 2012 entitled "Carton With Fitment"; and US Design Application No. 29/422,146, filed May 17, 2012 entitled "Closure" and whose entire contents are incorporated herein by reference in their entirety and for all purposes.

FIELD OF THE INVENTION

This invention is directed towards a container with a re-closeable pour spout. This invention further relates to producing moisture barriers by extrusion coating processes. The invention describes how to effectively use nucleation agents in extrusion coating of semi-crystalline polymers to improve the WVTR of a polymer-paperboard composite structure.

BACKGROUND OF THE INVENTION

This invention relates to containers having re-closeable fitments that can be used for food packaging. Paperboard containers are frequently used for packaging of food items. At times, it is desirable to offer a re-closeable container such that consumers can remove a small quantity of a food item and then re-seal the container.

Frequently, the ability of a consumer to reclose the packaging so that the contents stay fresh is difficult. Some packaging, such as cereals, will use a bag or inner pouch that helps keep the food item fresh until initially opened by the consumer. Thereafter, the cereal container and the bag/liner do not provide good sealing properties and the resulting food will have a shorter shelf life for the consumer.

Many food products are packaged in a paperboard carton in which the contents are further contained in a flexible bag or pouch. The bag or pouch is typically used to provide sufficient barrier properties to keep food fresh. In order to avoid using a bag or pouch, it is necessary to provide a paperboard packaging container that offers equivalent barrier properties. Heretofore, the cost of providing such paperboard packaging is not cost effective because of the large amount of moisture and/or oxygen barrier laminate coatings that must be applied to the packaging. Accordingly, there is room for improvement in the art with respect to paperboard barriers that can allow packaging of food without the inclusion of a pouch or bag.

It is also known in the art to apply a re-closable pour spout to facilitate the use of a food material from the container and to provide a better seal once the container is opened. One difficulty with the pour spout and fitments is that when applied to a paperboard container, the manner in which the pour spout is sealed to the carton can lead to a carton that has unacceptable water vapor transmission rates and oxygen barrier properties such that the shelf life of the food package therein is less than desired.

Accordingly, there remains room for variation in improvements in the art of cartons having pour spouts or fitments that can provide for a re-closeable packaging having necessary shelf life properties prior to purchase by a consumer and following initial opening of the container by the consumer. Accordingly, there remains room for variation and improvement in the art.

SUMMARY OF THE INVENTION

It is one aspect of one of the present embodiments of the invention to provide for an improved moisture barrier for a paperboard carton.

It is a further aspect of at least one of the present embodiments of the invention to provide for a moisture barrier for a carton that can be applied by an extrusion coating process and which can achieve a moisture barrier property equivalent to a plastic bag or pouch as typically used to package cereals and other food items.

It is a further aspect of at least one of the present embodiments of the invention to provide for a re-closeable pour spout that can be applied to the carton such that the carton maintains good moisture barrier properties along the region in which the pour spout is affixed to the carton.

It is a further aspect of at least one embodiment of the present invention to provide for a paperboard container having a re-closeable pour spout and having a moisture barrier applied during an extrusion coating process that offers a commercially viable shelf life for food products packaged therein and which maintains good moisture barrier properties once the contents in the container have initially been opened by a consumer.

It is a further aspect of at least one embodiment of the present invention to provide for an extruded paperboard laminate comprising a paperboard substrate having the first side and a second side; a first extruded layer of LDPE, extruded on to a first side of the paperboard layer; a layer of HDPE applied to the first layer, the HDPE layer further comprising a nucleating agent; a second extruded layer of LDPE applied the HDPE layer.

The nucleation agent can be one or more of Group II metal salts of organic dibasic acids, such as calcium 1,2-cyclohexanedicarboxylate, organic pigments such as c-quinacridone and Cibantine Blue 2B, and aromatic amide compounds such as N,N'-dicyclohexylterephthalamide and N,N'-dicyclohexyl-2,6-naphthalene dicarboxamide.

It is a further aspect of at least one embodiment of the present invention to provide for a method for manufacturing a heat sealable packaging material comprising the steps of:
  providing a paperboard substrate;
  applying a water vapor barrier layer containing HDPE and a nucleating agent as an extrusion layer on one side of the paperboard substrate; and
  applying an outer heat sealing layer to the substrate wherein the HDPE and nucleating layer is positioned between the paperboard substrate and the heat sealed layer.

It is a further aspect of at least one embodiment of the present invention to provide for a paperboard substrate comprising a plurality of extruded polymer layers wherein at least one of the polymer layers is a water vapor barrier layer consisting essentially of an extruded layer of HDPE containing a nucleating agent which promotes the crystallization of the HDPE extruded layer.

It is a further aspect of at least one embodiment of the present invention to provide for process of extrusion coating a moisture barrier layer onto a paperboard substrate using a nip roller on one side of the paperboard substrate and a chill roller on an opposite side of the substrate comprising the steps of:
  supplying a paperboard substrate;

supplying a melt curtain of at least two polymer layers to the paperboard substrate, at least one of the two polymer layers containing a moisture barrier layer of HDPE containing a nucleating agent, wherein the moisture barrier layer is separated from the chill roller by at least a second layer of the at least two polymer layers, wherein the nucleating agent present in the. HDPE coating is quenched at a slower rate than if the moisture barrier layer was in direct contact with the chill roller.

An additional step may include of reheating the paperboard surface having an extruded barrier layer of HDPE containing a nucleating agent, thereby increasing the activity of the nucleating agent within the HDPE containing barrier layer.

It is a further aspect of at least one embodiment of the present invention to provide for a carton with a fitment comprising a carton having a top panel, a bottom panel, a first side panel, a second side panel, a front panel, a rear panel, the first side panel having a height less than the second side panel, thereby defining an angled portion between the top panel and the upper edge of the first side panel;

an opening defined within the angled portion;

a reclosable fitment positioned above opening, the fitment having a top portion reversibly engaging a base, the top portion and the base connected by a hinge along a rear wall of the base, the base further defining a front edge wall perpendicular to the base, the front edge wall having an inner surface engaging a portion of the first side panel, a first side wall perpendicular to the base, the first side wall having an inner surface engaging an exterior portion of the first side panel, a second side wall perpendicular to the base, the second side wall having an inner surface engaging an exterior portion of the second side panel;

a rear edge wall of the fitment defining an angle greater than 90° relative to a plane defined by the base, the rear edge wall adapted for engaging an upper surface of a portion of a top panel in a substantially flush engagement.

These and other features, aspects, and advantages of the present invention will become better understood with reference to the following description and appended claims.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

FIGS. 1 through 6 are illustrations of a first embodiment of the invention of a paperboard carton having a re-closeable pour spout affixed thereto.

DESCRIPTION OF THE PREFERRED EMBODIMENT

Figure 1:
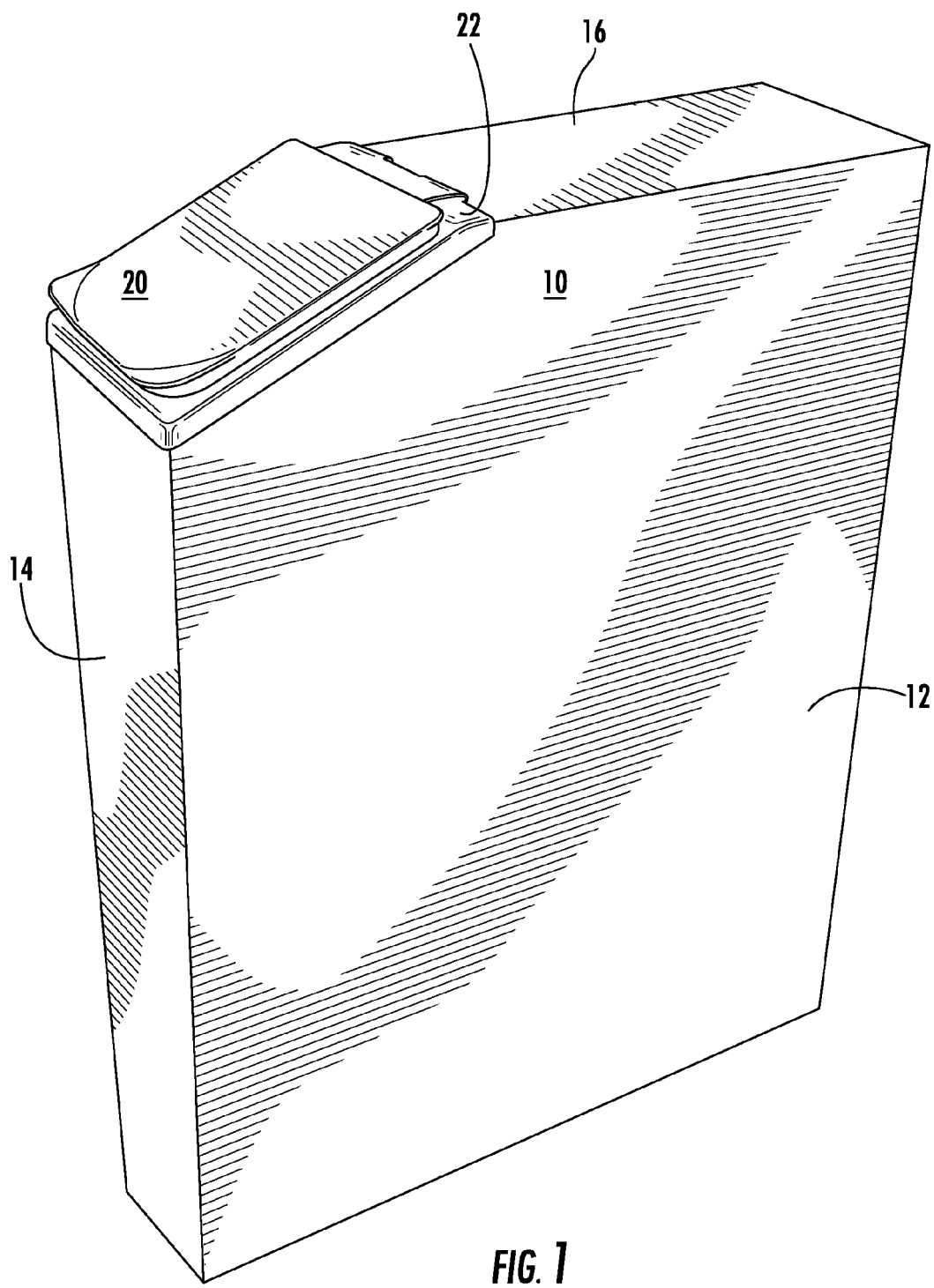

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

As seen in reference to FIGS. 1 through 6, a carton 10 is provided having a front panel 12, a rear panel 18, a left side panel 14 and a right side panel 19. A top panel 16 further defines a sloped region 17 (FIG. 19) where panel 16 attaches to panel 14. As best seen in reference to FIG. 1, the height of panel 14 is less than the height of the opposite panel 19.

In a preferred embodiment, the top panel 16 terminates in the vicinity of a hinge region 22 of fitment 20 such that an area beneath fitment 20 is substantially free of any paperboard substrate associated with top panel 16.

Figure 2:
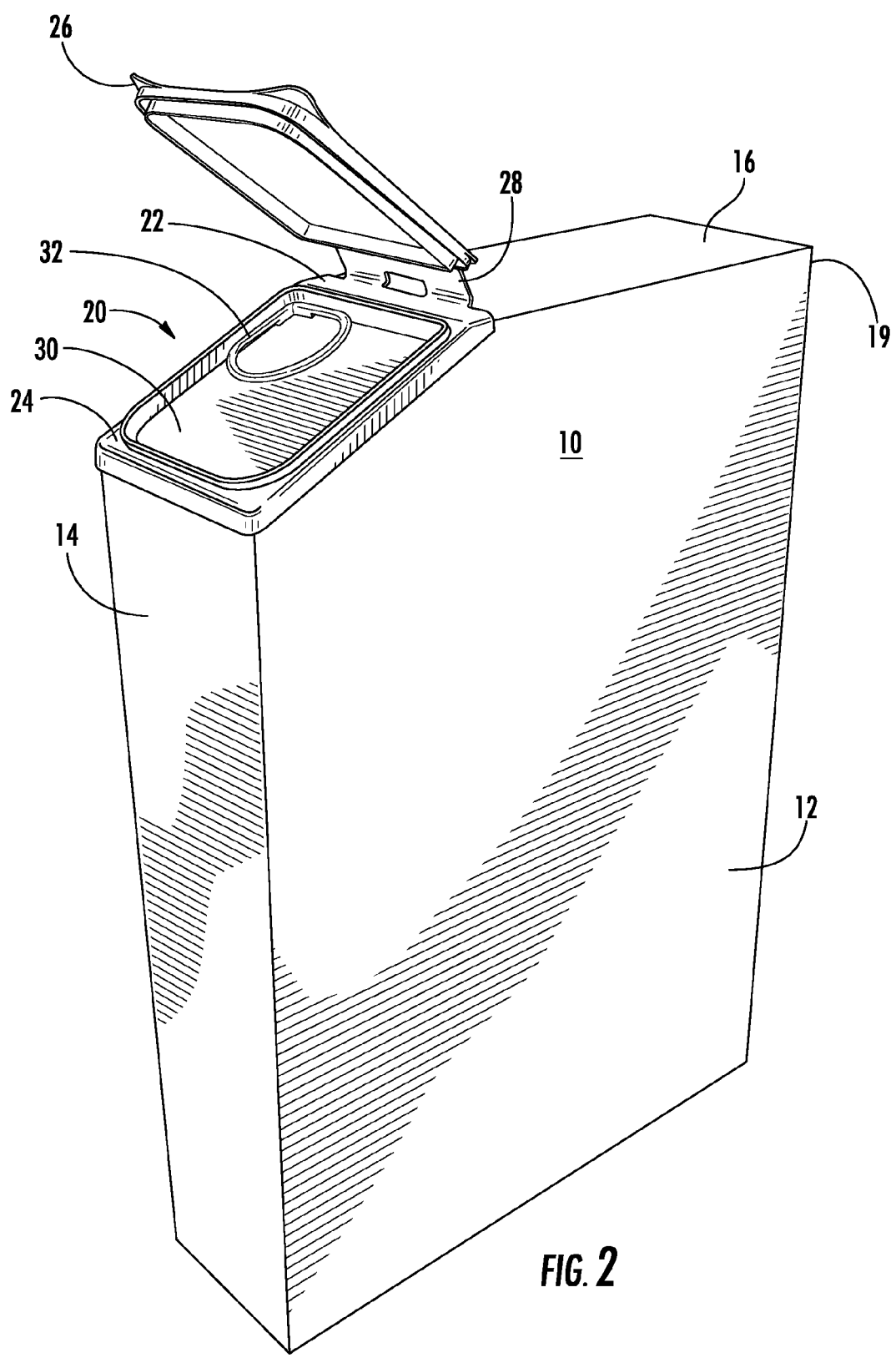
Figure 5:
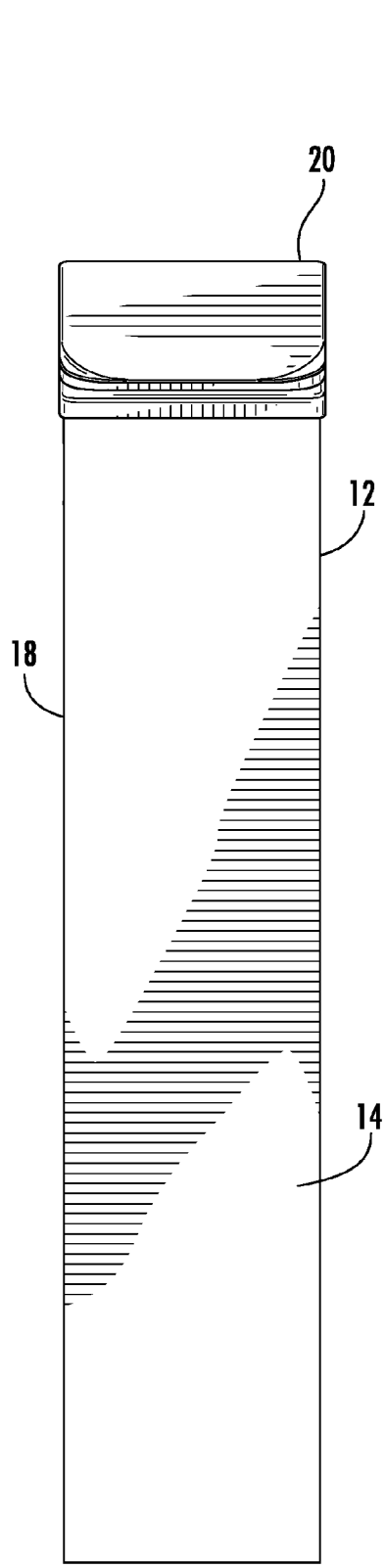
Figure 6:
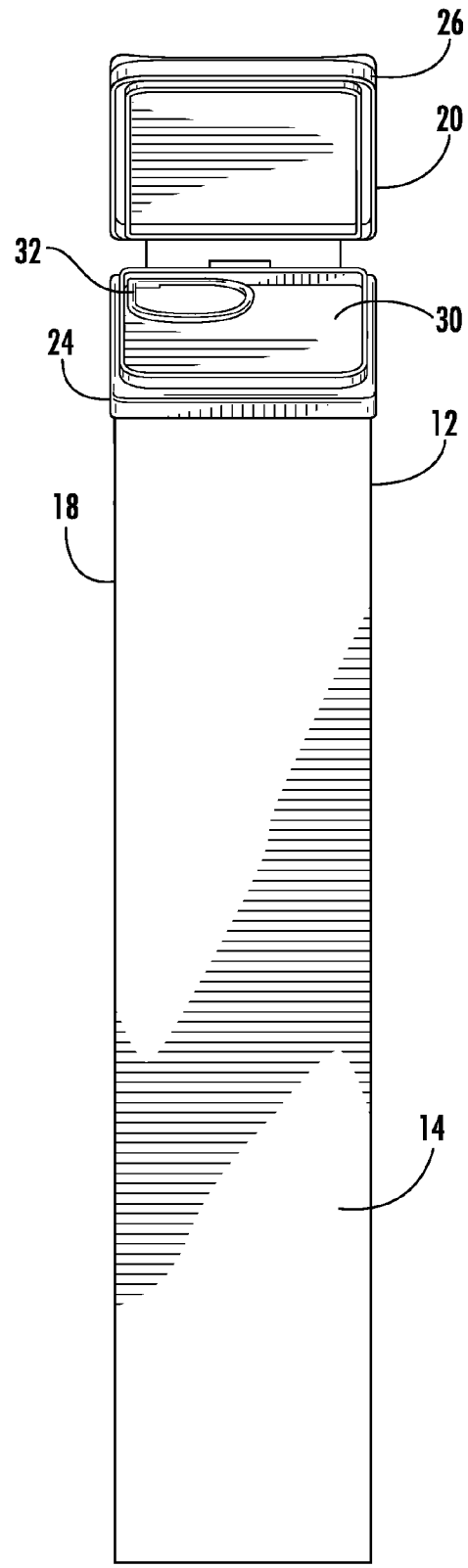

As seen in reference to FIG. 2, the pour spout 20 has a bottom portion 24 and an upper portion 26 which are joined along a hinge region 22 by a flexible hinge 28. In an initial configuration, there is a plastic barrier layer 30 which is connected to a pull ring 32. Pull ring 32 can be accessed by the consumer to remove the layer 30 as to provide access to the carton contents via the pour spout 20. Upper portion 26 defines at least on flared corner 21 which extends above a plane of the main portion of upper position 26.

Figure 18:
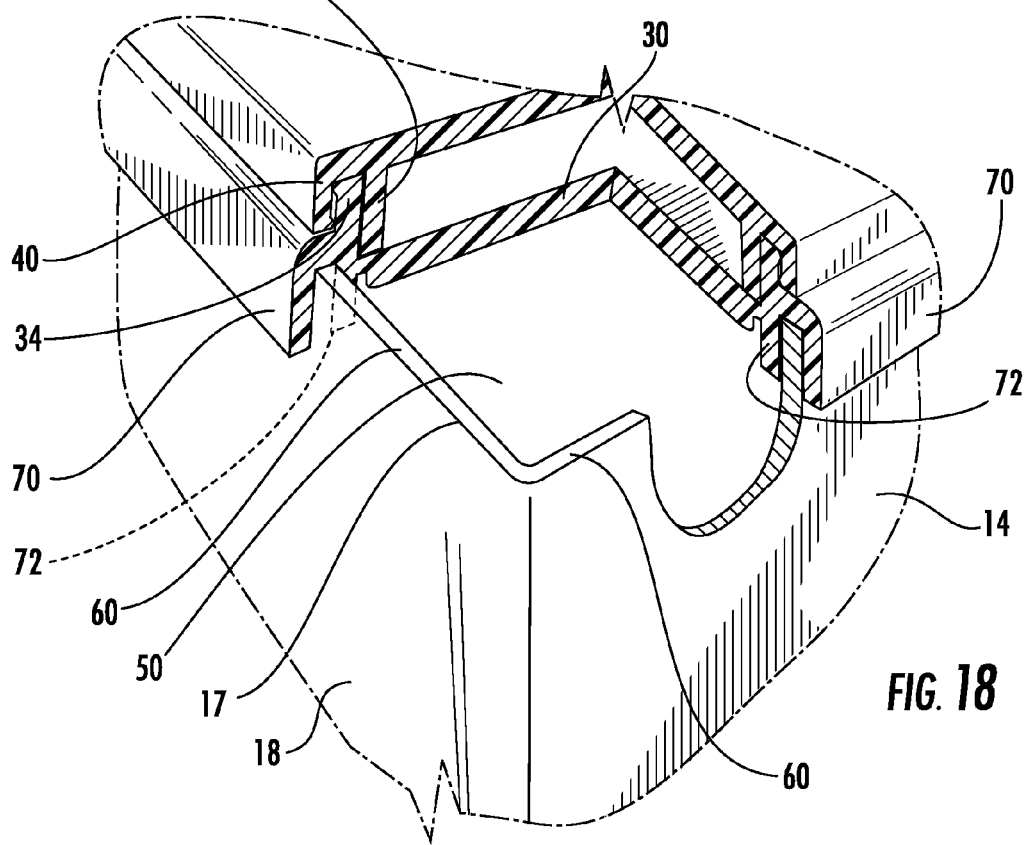

As seen in reference to FIGS. 1, 2, and 18 the pour spout 20 engages the edge walls of carton sides 12, 14, 16 and 18 such that exposed edges of the carton wall will nest within the lower edge walls of the carton fitment. The fitment 20 is applied to the carton 10 using a hot melt adhesive. The hot melt adhesive is applied in a sufficient quantity such that a moisture resistant seal is established between the fitment edge walls and a lower surface 25 of bottom portion 24 and the respective edges of the carton opening. While conventional hot melt adhesives such may be utilized, sonic welding of the fitment to the carton can also be used. If desired, the portion of the fitment which adheres to the edges of the carton can be pre-supplied with necessary adhesive or polymeric material so that upon exposure to heat, a bead of molten material will melt and seal the fitment around the edges of the carton opening.

Figure 7:
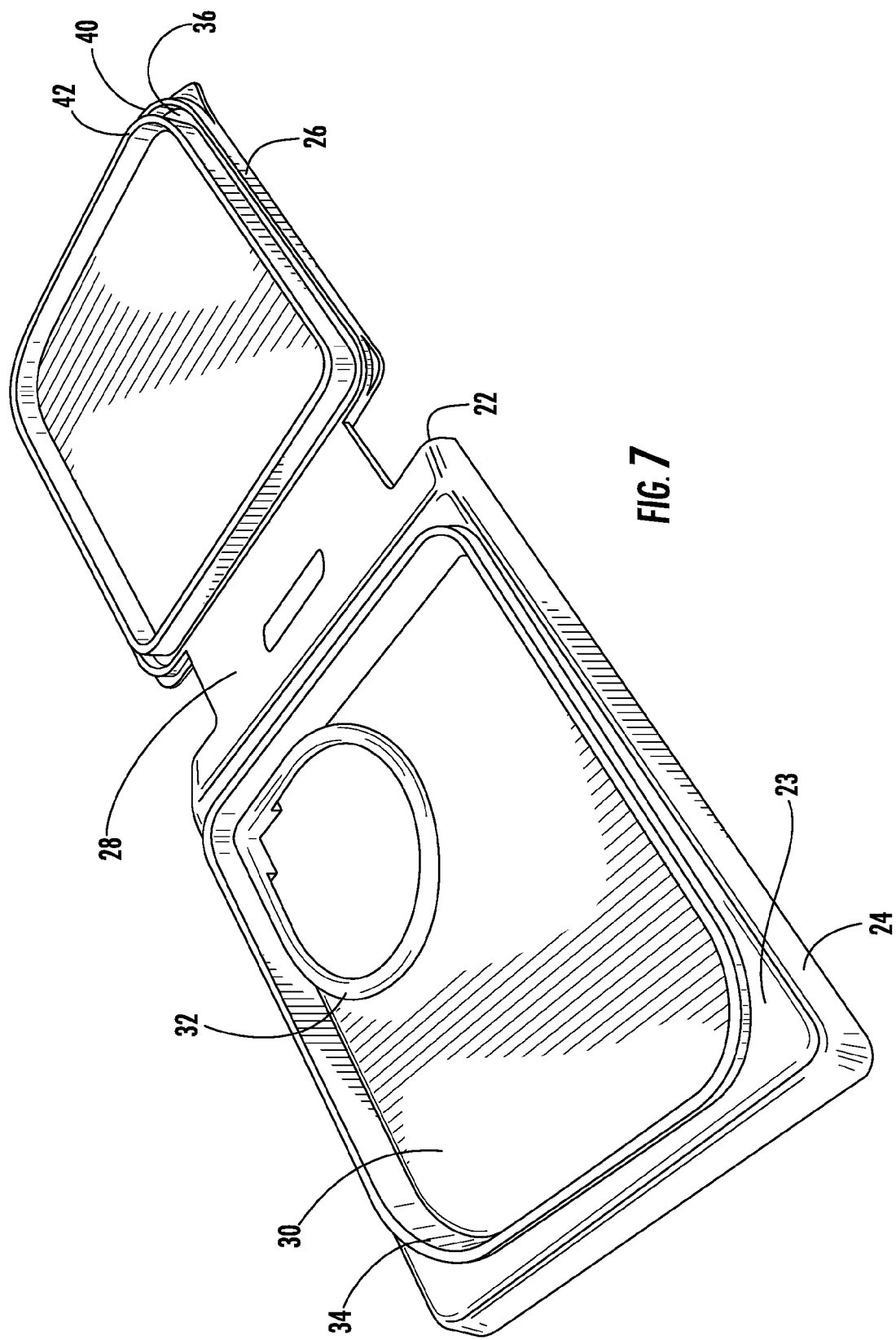
FIGS. 7-12 set forth details of one embodiment of a re-closeable fitment that can be used with a paperboard container.
Figure 8:
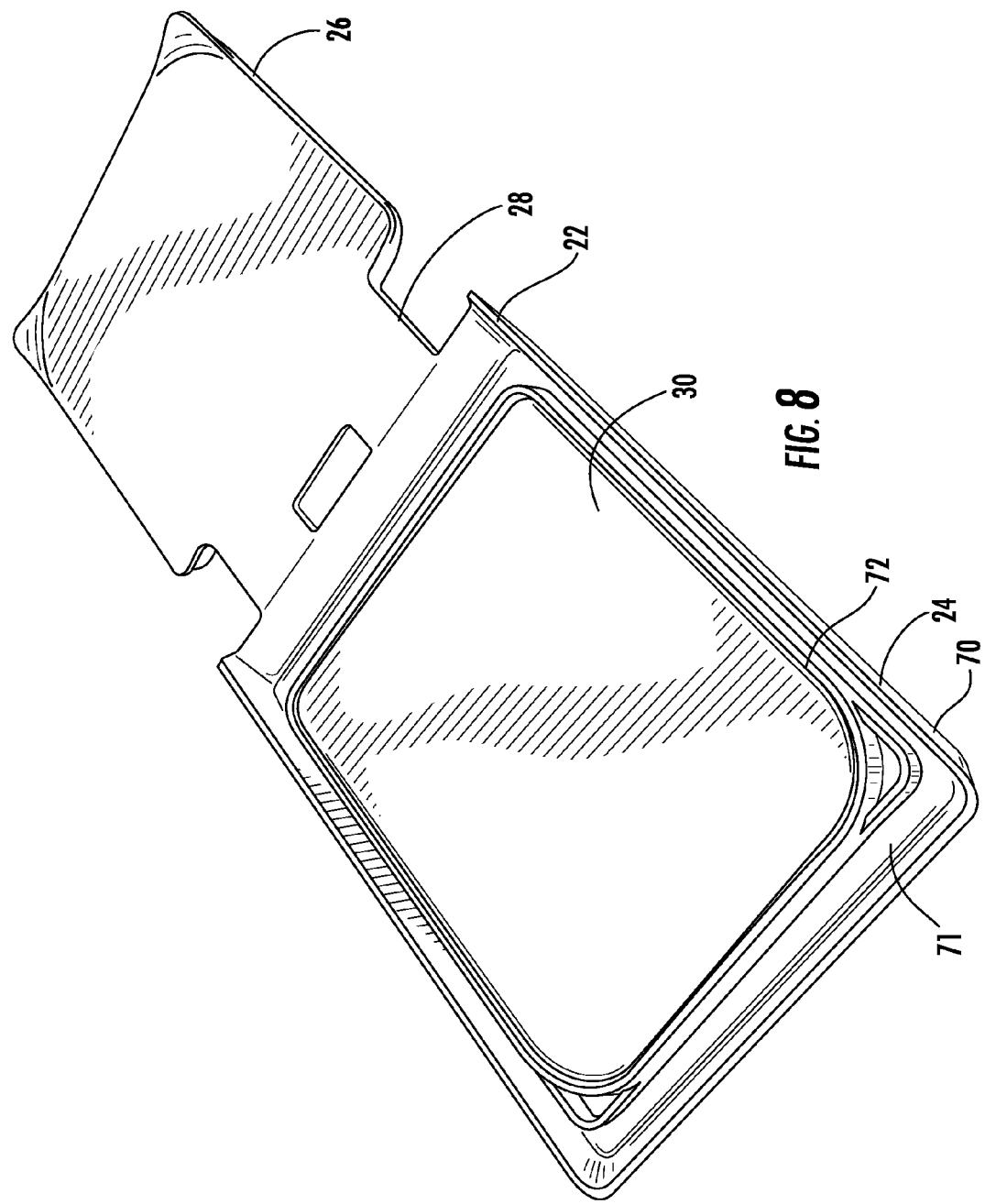
Figure 9:
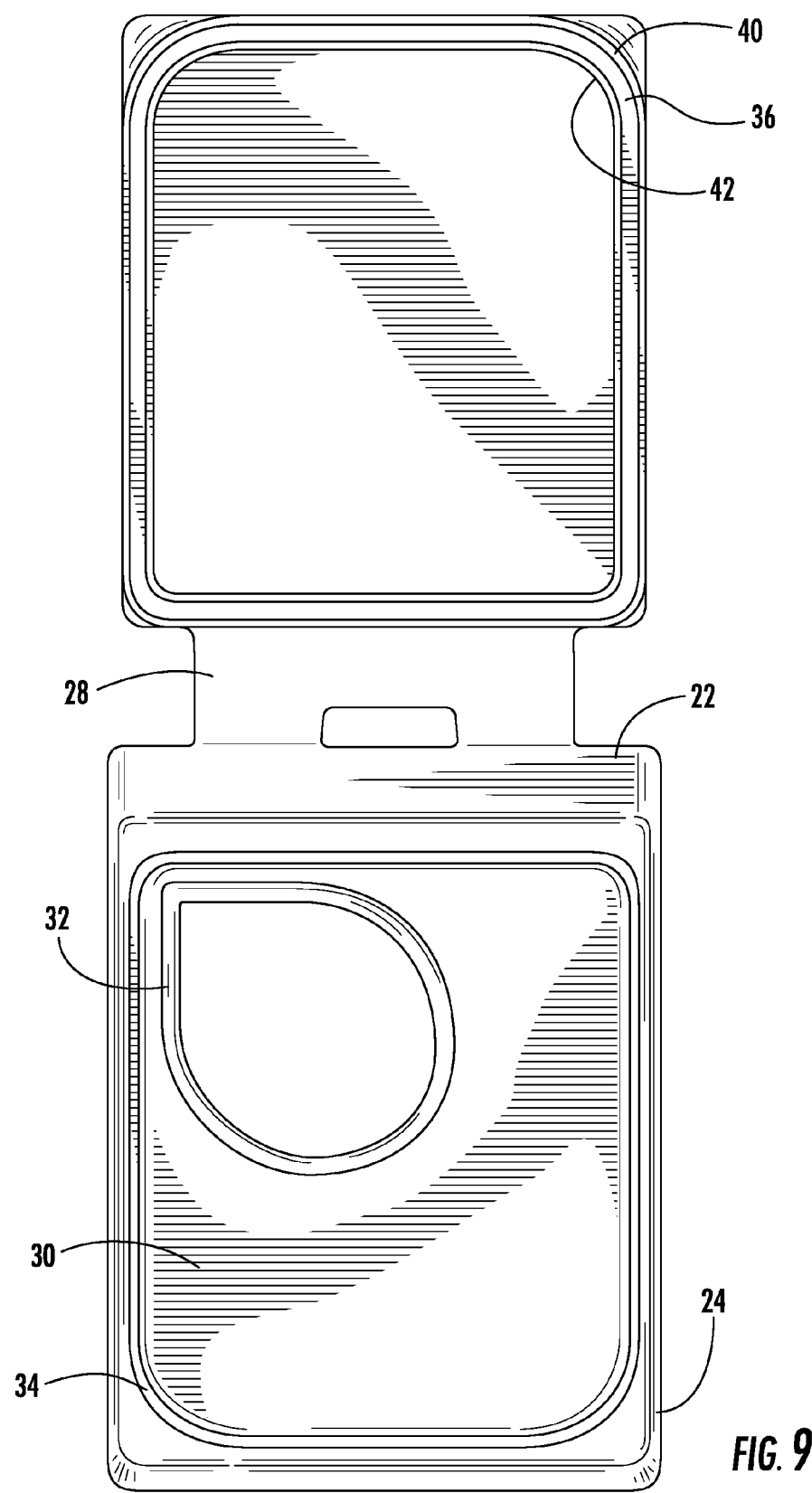
Figure 10:
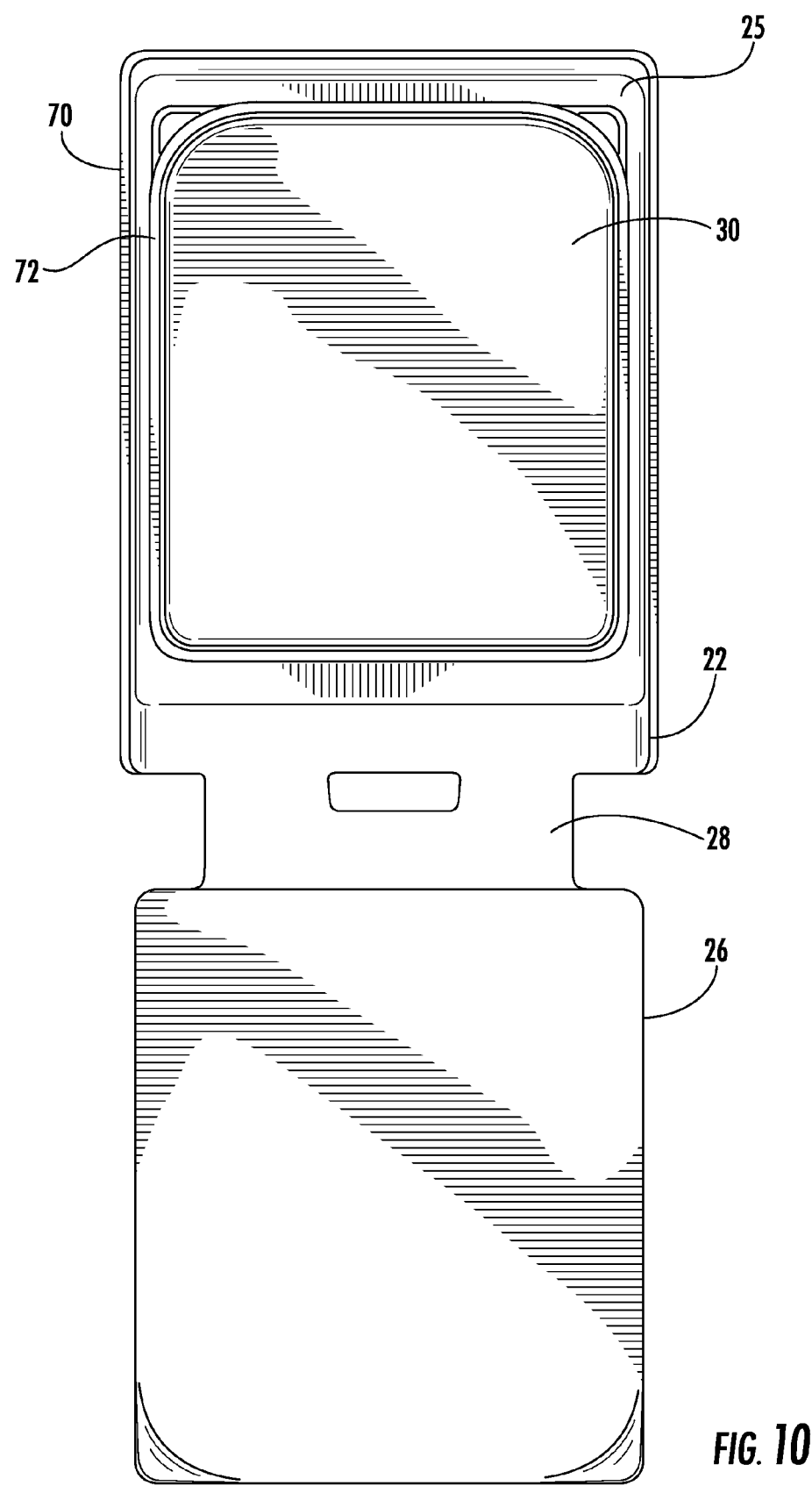
Figure 11:
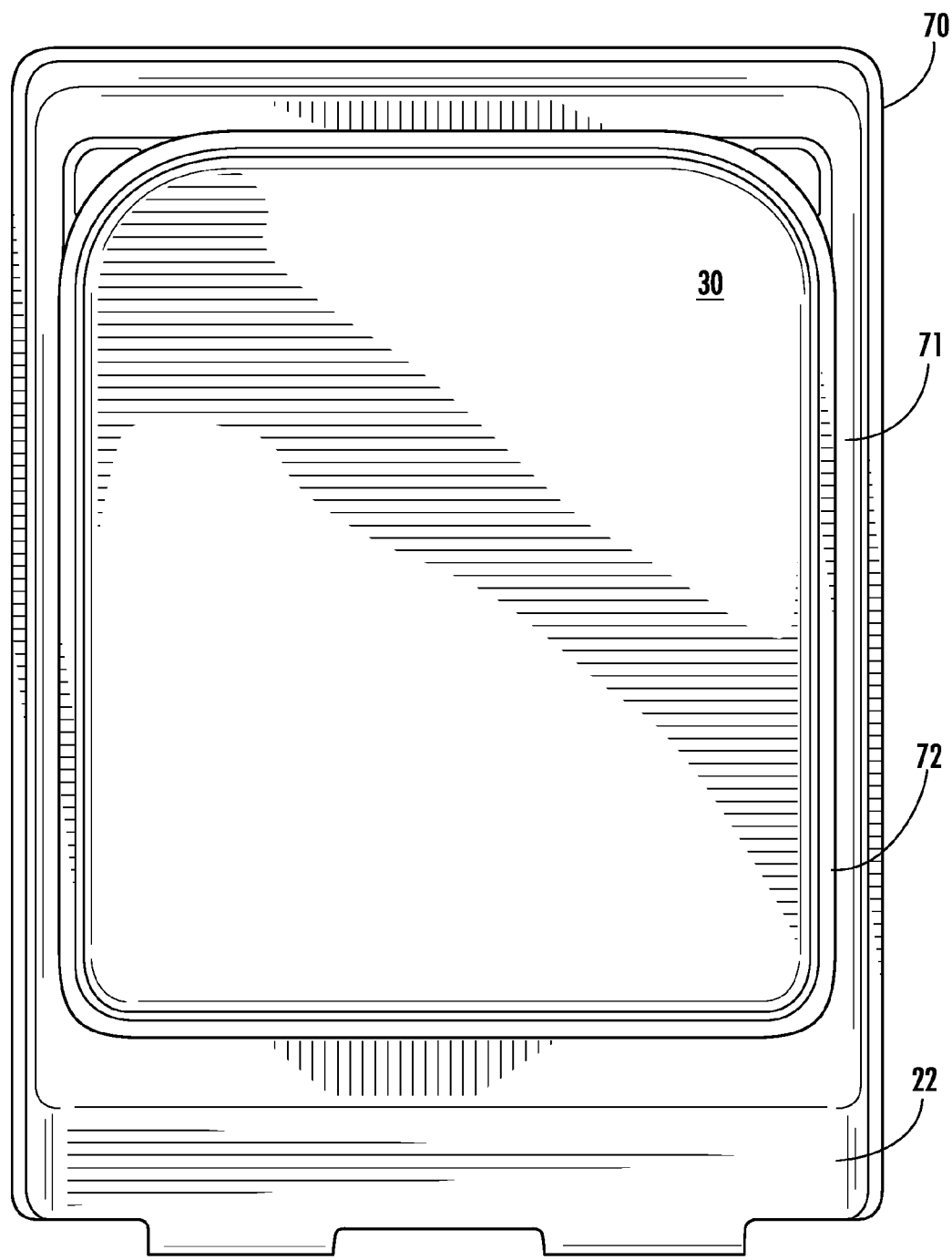
Figure 12:
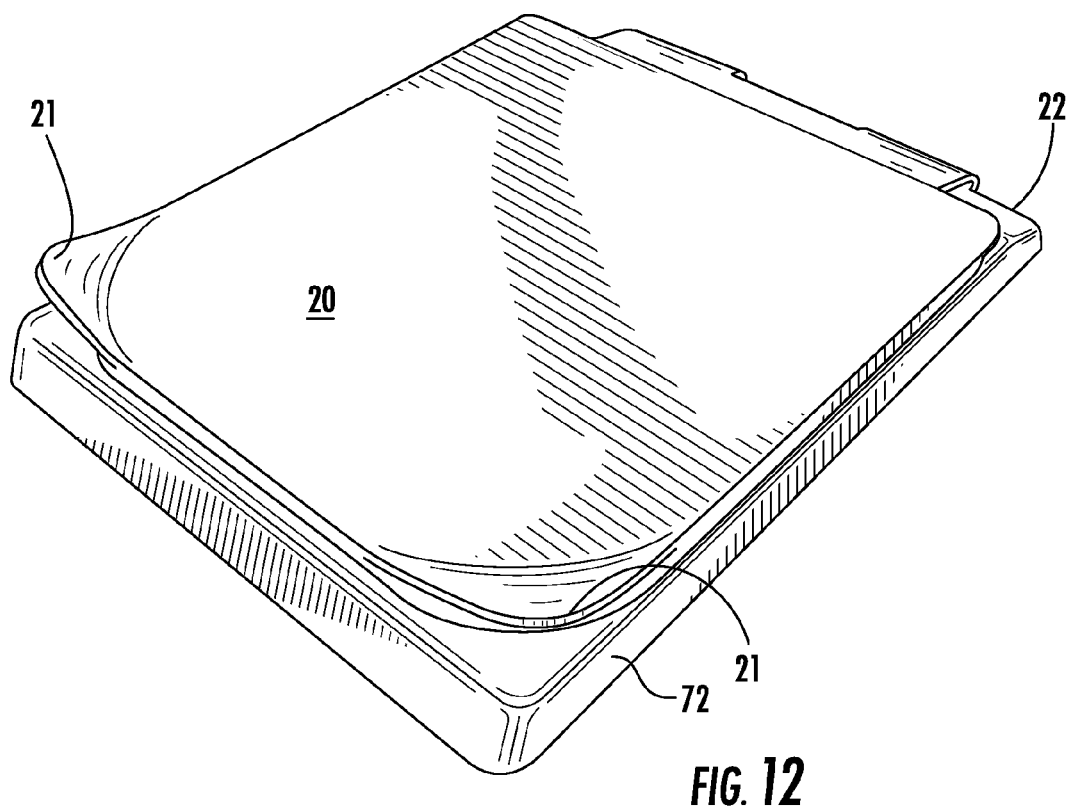
Figure 13:
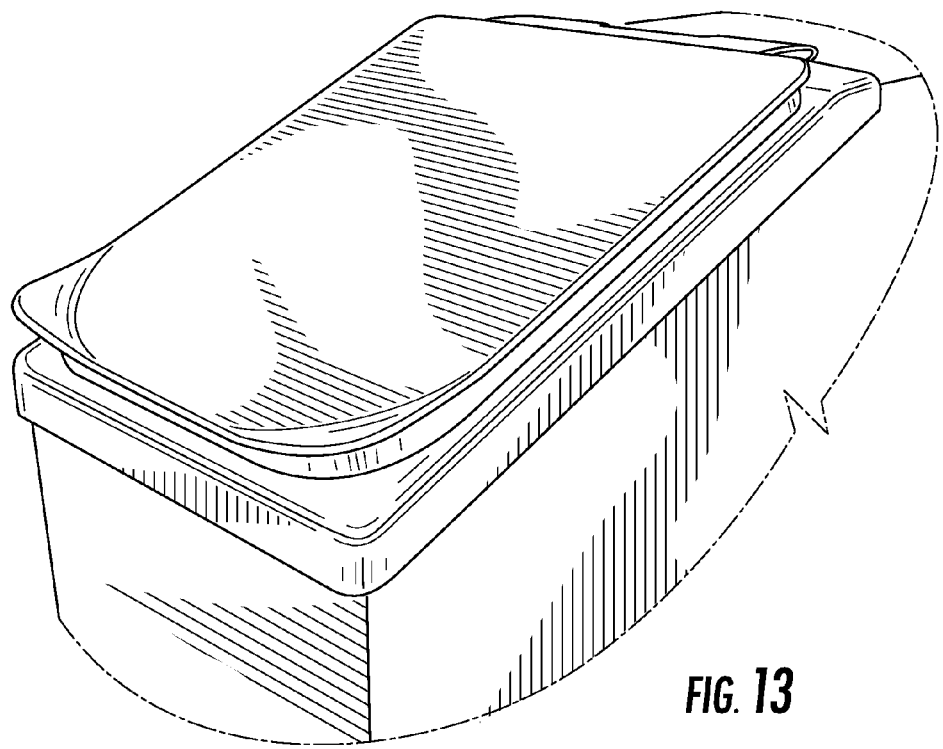
FIGS. 13-20 illustrate additional detail of a representative pour spout applied on an angled shoulder of a carton.
Figure 14:
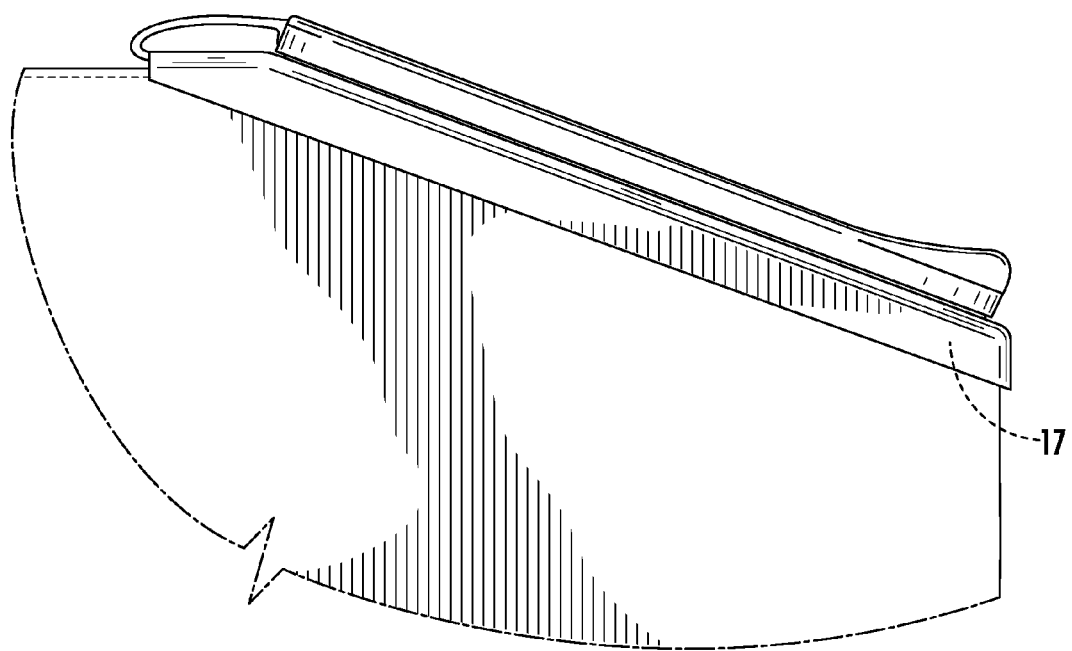
Figure 15:
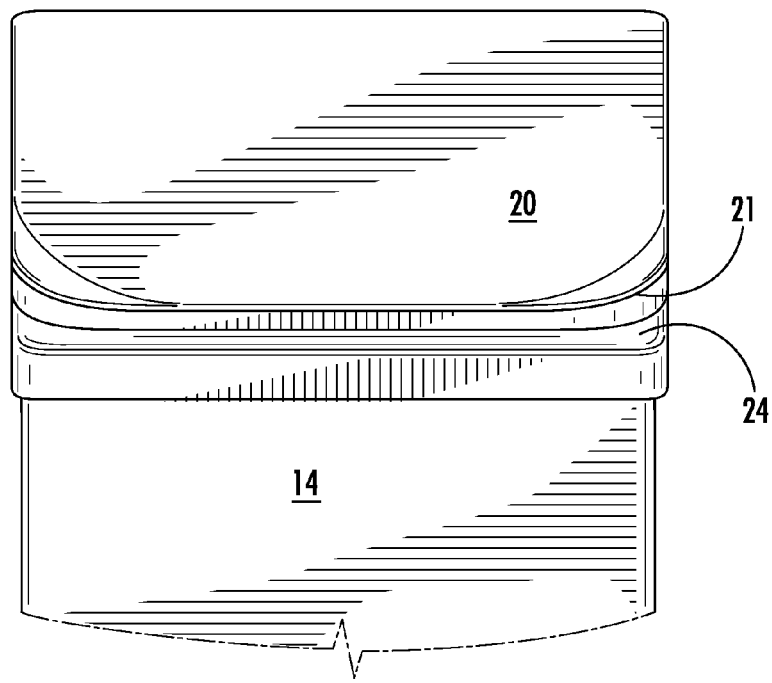
Figure 16:
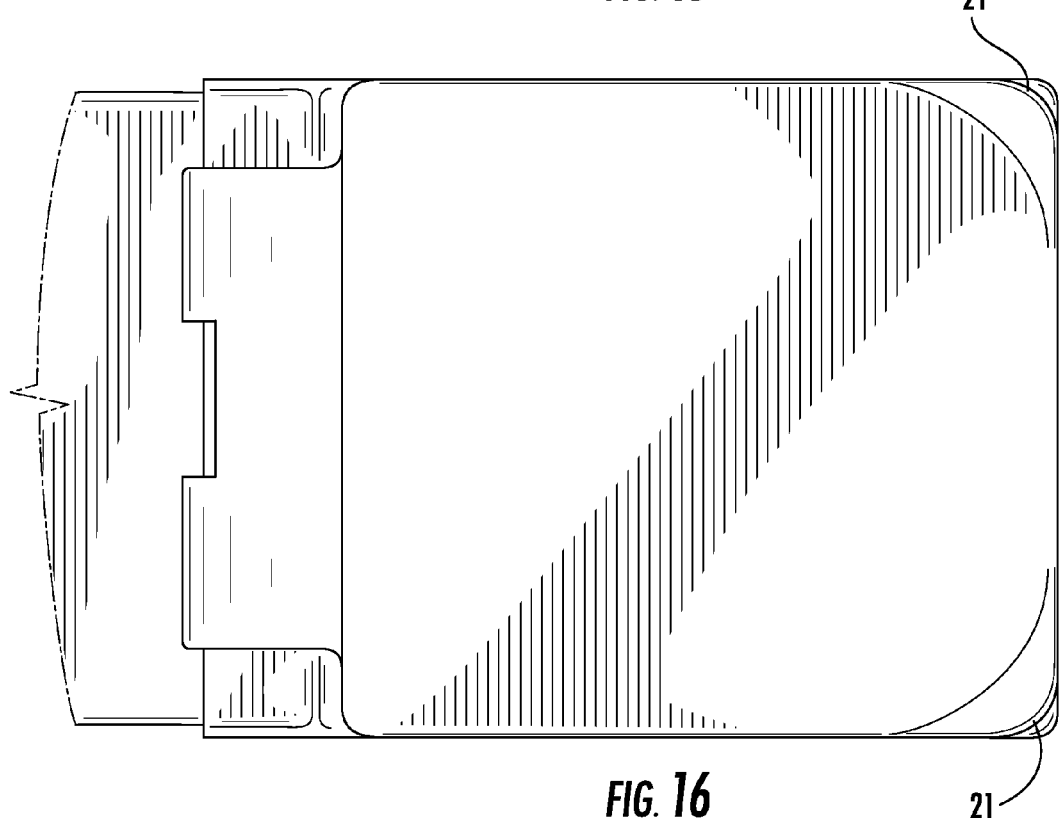
Figure 17:
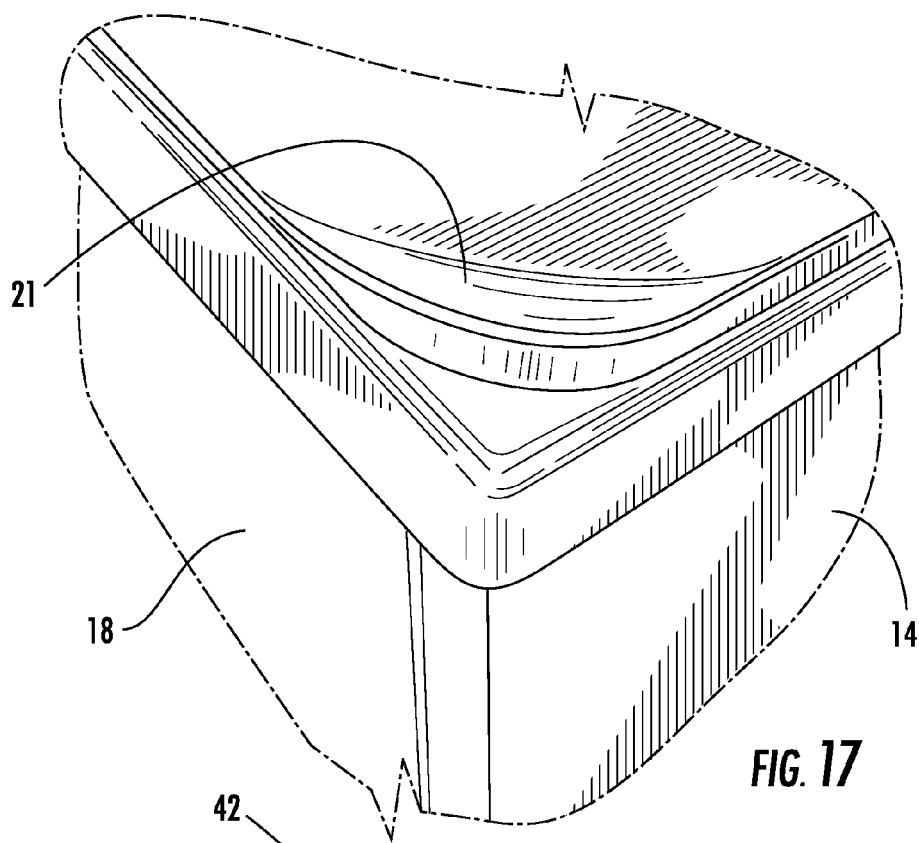

As best seen in reference to FIG. 7, a base of the fitment has an upper surface which defines a raised lip 34 which extends in a general rectangular shape upon the upper surface 23 of the fitment, base 24. The lip 34 is adapted to reversibly mate within a gap 36 defined between a first wall 40 and a second wall 42 which are carried on an inner surface of the fitment top 26. A friction fit is established between raised lip 34 and gap 40 such that the fitment can be maintained in a closed and substantially air tight configuration. A closed configuration can be seen in reference to FIG. 1 and FIG. 12.

As best seen in reference to FIG. 18, a cut-away view of a closed fitment is seen in reference to an opening 50 defined along the sloped top edge of carton 10. As further seen in reference to FIG. 18, the opening formed by the respective edge walls 60 inter-engage a gap portion 71 defined by an outer perimeter wall 70 and an adjacent inner-wall 72. Gap 71 receives carton edges 60. It is the gap region 71 between walls 70 and 72 in which the carton edge wall 60 engages an appropriate amount of hot melt adhesive or polymer material that is applied to bring about a moisture resistant seal between the fitment and the carton opening.

As best seen in reference to FIG. 18, inner wall 72 with an edge of the plastic barrier 30 which may be removed by pull ring 32. The width of gap 71 defined between outer perimeter wall 70 and the adjacent inner wall 72 can vary depending in part on the inventions of the barrier portion 30. Accordingly, the inventions of gap portion 71 can be varied.

In some embodiments, a gap distance is provided in which opposite edges of perimeter wall 70 and adjacent inner wall 72 will be physically engaged by the corresponding sides of carton panels associated with carton edges 60. In other embodiments, the dimensions of the plastic layer 30 and corresponding opening can be relatively reduced in size such that there is as sizable space formed between the perimeter wall 70 and the adjacent inner wall 72. In some embodiments of the invention, an adjacent inner wall 72 could be lacking in its entirety such that the fitment is held in place only by the adhesive which engages carton edge walls 60, opposite surfaces of an inner wall of perimeter wall 70, and corresponding panel edges of carton 10. Ideally, the inner wall surfaces of perimeter wall 70 will physically engage the corresponding exterior panel surfaces of carton 10. The subsequent application of a hot metal adhesive (not illustrated) will adhere a fitment to the upper opening defined between top panel 16 and left side panel 14. Preferably, the hot melt adhesive used to secure the fitment to the carton provides a sealed barrier between the fitment and the carton edges so as to prevent the unwanted migration of gas or fluids between an exterior and as identified of the carton.

Figure 19:
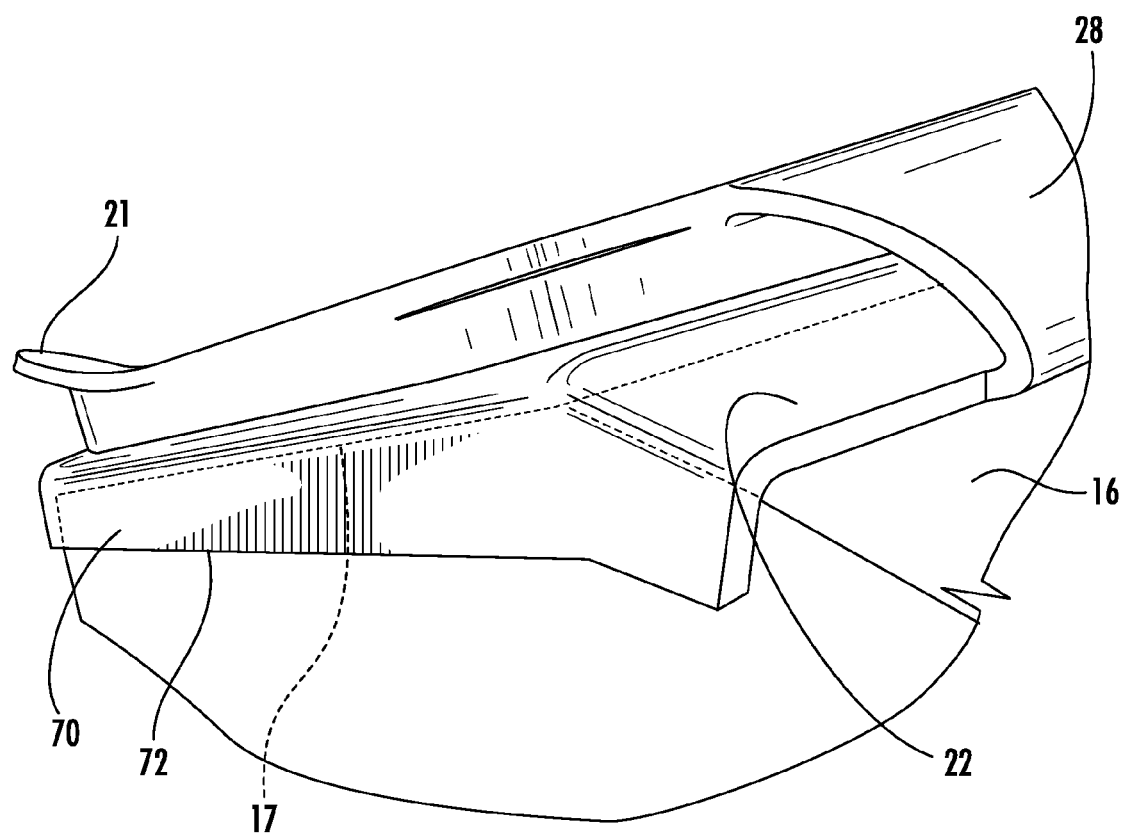

As best seen in reference to FIGS. 1 and 19, the fitment 20 is supported at multiple locations relative to the carton. The exposed carton edge walls 60 are positioned within a gap defined between, the lower fitment edges 70 and 72. In addition, a hinge region 22 of the fitment is supported by a portion of the top carton panel 16. As seen in reference to FIG. 19, the base of the fitment associated with the hinge is angled relative to the rest of the hinge such that the hinge portion 22 can engage a flat surface of panel 16. The remaining portion of the fitment base is angled relative to hinge portion 22 to accommodate the downward slant of the exposed carton edge walls where the opening 50 is defined between top panel 16 and side panel 14. Hinge region 22 also provides a high surface area contact with carton panel 16 which can be used as a location for an adhesive.

As seen in the FIG. 19, in one embodiment of the invention, the rim portion 70 extends downwardly along the respective edge walls of the carton so as to provide for seal integrity between the fitment and the carton. As a result of the multiple attachment positions between the fitment and the carton edge walls, a much stronger bonded structure results. The fitment 20 is supported by the carton edges which provides a stronger support than if a fitment was residing entirely within a single panel of a carton. As such, the fitment can withstand shipping and handling conditions without being weakened and compromising the integrity of the seal between the fitment and the carton.

Figure 20:
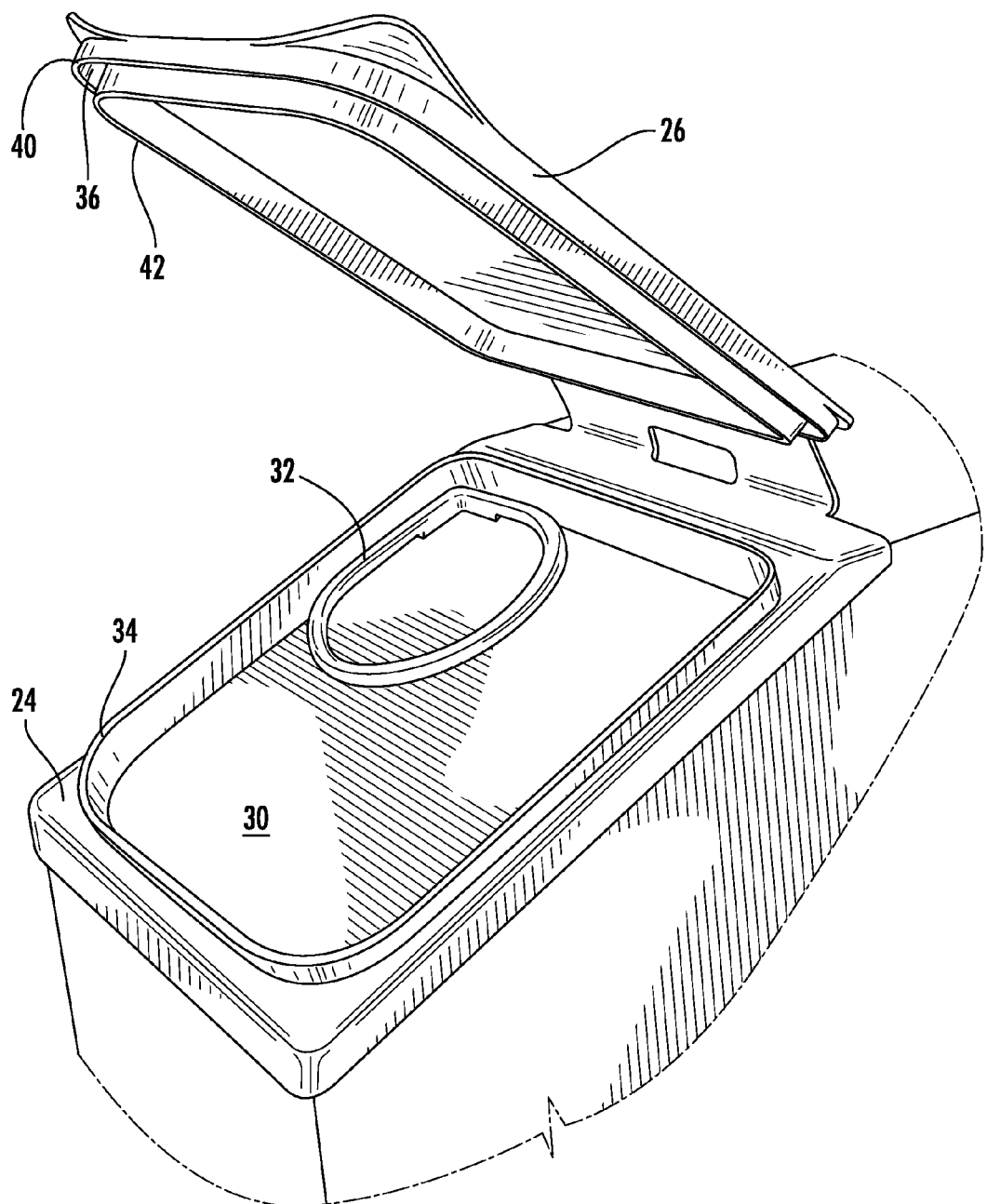
Figure 21:
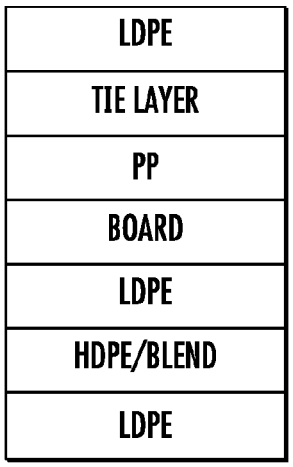
FIGS. 21-25 set forth paperboard substrates with barrier layers suitable for use as a paperboard container for cereal and other dry food goods and products.
Figure 22:
Figure 23:
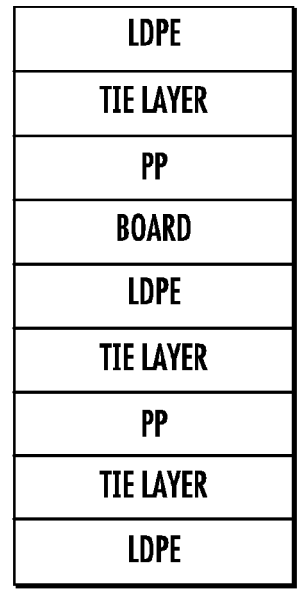
Figure 24:
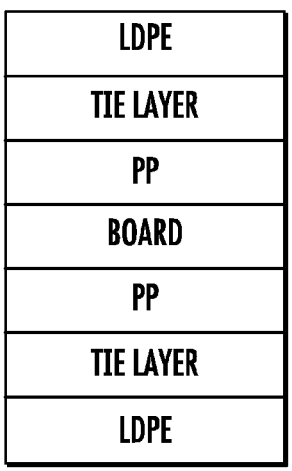

As seen in reference to FIG. 20, the hinged top 26 can be maintained in an open configuration and is sufficiently spaced from the opening of the pour spout that contents can be poured through the carton and pour spout without interference from the hinge top 26. Preferably, the hinge 28 has an ability to maintain the top in any position such that the hinge has sufficient low memory to maintain a position without undesired movement or closure.

In accordance with the present invention, it has been found that moisture barrier properties of an extrusion coated board will allow for an economical paperboard packaging that has water vapor barrier properties that are equivalent to packaging using high density polyethylene (HDPE) bags or moisture barriers using aluminum or metalized oriented polypropylene (MOPP).

Both a method of forming a coated paperboard and the resulting coated paperboard formed into a carton can be provided by the inclusion into an extruded polymer layer a nucleation agent. Typically, nucleating agents are used in blown films associated with dry food packaging. Surprising, it has been found that contrary to the expectations, a nucleating agent can also bring about benefits in extrusion coating HDPE polymer layers. The nucleating agent allows for an extrusion coating process for cartons that provide high moisture barrier HDPE extrusion coating for paperboards for cereal and dry food packaging. This method involves using calcium dicarboxylate salts and other listed nucleating agents in the co-extrusion coating or extrusion coating in tandem process. The temperature of the polymer melt in the extrusion process is between 650 and 620° F., which is significantly higher than the temperatures normally used for film casting and film blowing processes. It has been found that with proper design of polymer structures for extrusion coating, the nucleation agent can effectively improve the moisture barrier property of paperboard structure, having HDPE barriers, by 20%.

US patent application (2008/0227900) and which in incorporated herein by reference describes the use of calcium dicarboxylate based nucleation agent in HDPE blown film production. The patent teaches that the nucleation agent doesn't work equally for all the HDPE resins. The effectiveness depends on the long chain branch index. However, the patent was limited to HDPE blown film applications for the nucleation agent. There was no teaching or suggestion on use of a nucleation agent for high temperature extrusion coating.

The resins for moisture barriers are HDPE, PP, and mixtures thereof. The inclusion of a nucleating agent requires a masterbatch of nucleation agent which can mix and disperse quickly within the polymer resin in the extruder.

Masterbatches formulated according to U.S. Pat. No. 7,491,762, and which is incorporated herein by reference, can be used.

The nucleation agent is subjected to high temperatures during extrusion coating. In one embodiment, the nucleating agent calcium 1,2-cyclohexanedicarboxylate was subjected to temperatures from 450 F to 610 F sequentially through the zones of the extruder and the slot die. It was surprisingly found that calcium 1,2-cyclohexanedicarboxylate was stable through the process and did not require adjustment of extrusion temperatures to accommodate the use of this type of nucleation agent. Other nucleating agents can include Group II metal salts of, organic dibasic acids, organic pigments such as c-quinacridone and Cibantine Blue 2B, and aromatic amide compounds such as N,N'-dicyclohexyl-terephthalamide and N,N'-dicyclohexyl-2,6-naphthalene dicarboxamide present in a loading range of between about 500 ppm to about 2500 ppm.

As discussed below, an effective amount of a nucleating agent for HDPE includes of a nucleation agent at a concentration of 2000 ppm. This has been found to provide an effective amount of water vapor barrier properties when used with a coating rate of about 13# to about 16# per 3000 sq. feet of board. As used herein, the term "effective amount" includes amounts sufficient to achieve a reduction in a WVTR values. One having ordinary skill in the art, and without undue experimentation, would be able to evaluate a structure for sufficient water vapor transmission rate values depending upon the end use and as influenced by the type, number and thickness of additional polymer layers present in the substrate of an extrusion coated board structure.

Fast cooling or quench of the nucleated semi-crystalline polymer by a chill roll immediately after drawings of the polymer melt works against the function of nucleation, crystallization, and orientation of the polymer. Rapid quenching reduces the amount of crystal orientation which can occur in the polymer. Rapid quenching promotes crystalline structures which favors a high WVTR.

In contrast, polymers in film blowing process does not experience such rapid changes of temperature. For example, the temperature of HDPE can decrease from ~320° C. to ~20° C. in just about 0.3 s in extrusion coating or cooling at ~1000° C./s. In contrast, the temperature only decreases from ~230° C. to ~115° C. (the frost line temperature of HDPE) in a matter of 3 to 10 seconds in a blown film process or cooling at 38 to 12° C./s.

To solve this problem, instead of applying nucleated semi-crystalline polymer directly against the chill roll, an additional layer or layers of polymer are co-extruded and fed at the position between the nucleated polymer layer and the chill roll. The additional layer (s) will allow for a more gradual cooling of the nucleated polymer and the results in a better barrier layer.

A similar effect can also be achieved by using two extruders in tandem. For example, the nucleated polymer is cooled down by the chill roll at the first station, and reheated as the web passes through the second station where the hot melt of an additional polymer layer is drawn down on the already cooled surface. The nucleated polymer is reheated to the temperature where further crystallization can proceed. The flexibility allows coaters without co-extrusion capabilities to utilize a nucleator agent in the HDPE layer(s).

The additional polymer layer(s) also contribute to the decrease the WVTR of the overall structure and provide the function as a sealing layer for converting. Polymers for the additional layer(s) include LDPE, LLDPE, mPE, tie sealants and other heat sealable versions.

Furthermore, additional layer(s) of polymer can be co-extruded adjacent the nucleated polymer layer and is not in direct contact with the chilled roll. This arrangement slows down the cooling process and increases the desired activity of the nucleating agent.

The additional layer(s) may also improve adhesion between the nucleated polymer and the substrate and further decrease the WVTR of the overall structure. Polymers for the additional layer(s) may include LPDE, LLDPE, polypropylene, Nylon, and adhesive tie layers.

Flame treatment of paperboard prior to coating also contributes to the slowdown of loss of heat from the nucleated polymer to the chill roll.

The laminates as described below, have a WVTR value in the range of ~0 to 8 gm/m$^2$/day (~0 to 0.5 gm/100 in$^2$/day) at 100° F. and 90% RH measured with Mocon Permatran equipment according to procedures set forth in ASTM F1249 -06.

As used herein, the reference to extruded polymer layers present on the paperboard substrate in referenced in pounds. It is well known in the art, the coating weight given in pounds is in reference to a board surface area of 3,000 square feet.

EXAMPLE 1

A nucleation agent calcium 1,2-cyclohexanne dicarboylate was blended with HDPE at a final concentration of 2000 ppm. The HDPE-Nuel blend ("blend") was coextruded with two layers of LDPE on a paper board with the structure, paperboard/8#LDPE/13#HDPE-Nucl blend/10#LDPE. In parallel, the above process was repeated without addition of nucleation agent.

TABLE 1

Set temperatures (° F.) for the extruder for processing LDPE/HDPE/LDPE structure by coextrusion.

|  | Zone-1 | Zone-2 | Zone-3 | Zone-4 | Zone-5 | Adapter/Pipe | Die |
| --- | --- | --- | --- | --- | --- | --- | --- |
| LDPE | 350 | 450 | 550 | 610 | 610 | 610 | 610 |
| HDPE | 350 | 450 | 550 | 610 | 610 | 610 | 610 |
| LDPE | 350 | 450 | 550 | 610 | 610 | 610 | 610 |

The comparison of WVTRs with and without nucleation agent of Example 1 indicates the inclusion of the nucleating agent reduces the WVTR of the board structure by 21%, achieving a WVTR value of 0.21 g/100 in$^2$/day compared to 0.27 g/100 in$^2$/day.

EXAMPLE 2

A nucleation agent was blended with HDPE at a final concentration of 2000 ppm. The HDPE-Nuel blend was coextruded with one layer of LDPE on a paper board. The coated web passed through a chill roll, and then was immediately coated with another layer of LDPE at the subsequent extrusion station. The final structure was paperboard/8#LDPE/13#HDPE-Nucl blend/10#LDPE. In parallel, the above process was repeated without addition of nucleation agent.

TABLE 2

Set temperatures (° F.) for the extruder for processing LDPE/HDPE/LDPE structure by extrusion in tandem.

|  | Zone-1 | Zone-2 | Zone-3 | Zone-4 | Zone-5 | Adapter/ Pipe | Die |
|---|---|---|---|---|---|---|---|
| Station-1 |  |  |  |  |  |  |  |
| LDPE | 350 | 450 | 550 | 610 | 610 | 610 | 610 |
| HDPE | 350 | 450 | 550 | 610 | 610 | 610 | 610 |
| Station-2 |  |  |  |  |  |  |  |
| LDPE | 350 | 450 | 550 | 590 | 590 | 590 | 590 |

Even though the structure was processed with extrusions at two different stations, a 20% reduction of WVTR. Achieving a WVTR value of 0.20 g/100 in$^2$/day compared to 0.25 g/100 in$^2$/day a single station without the use of a nucleation agent.

EXAMPLE 3

The paperboard structures from Examples 1 and 2 were converted into boxes for cereal packaging without using bags.

This invention teaches a method to manufacture a fiber based barrier board with polymer coatings, which provide high stiffness, minimal curl and excellent moisture barrier and gas barrier properties.

EXAMPLE 4

An extrusion coated packaging board had the structure of 9# LDPE/11# PP/board/8# LDPE/ 16# HDPE blend/8# LOPE. For comparison, a reference structure had 9# LDPE/ board/8#LDPE/16# HDPE blend/8# LDPE. Sheet samples of size 29 cm×29 cm were cut from each board and conditioned equally overnight. Boards coated with HDPE on one side exhibits unacceptable levels of curvatures. The board coated with HDPE on one side and PP on the other side is substantially flat. The radius of the curled sample is 42 cm and that of the sample coated on both sides is almost infinity.

EXAMPLE 5

An extrusion coated packaging board had the structure of 14# LDPE/14# PP blend/board/8# LDPE/15# HDPE blend/ 8# LDPE. The PP is blended with 10% LDPE. For comparison, a reference structure had 14# LDPE/14# PP blend/ board. Sheet samples (29 cm×29 cm) were cut from each board and conditioned equally overnight. The referenced board coated with PP blend on one side is curved. The board coated with PP blend on one side and HDPE blend on the other side is not curved.

EXAMPLE 6

Two extrusion coated boards were manufactured by the process described in examples 1 and 2.

Structure-1 comprised 12#LDPE/board/15# HDPE blend/ 8#LDPE/10#LDPE.

Structure-2 comprised 12#LDPE/board/8#LDPE/ 10#LDPE/15#HDPE blend.

For structure-1, in Example 6, the HDPE blend did not contact chill roll in the extrusion nip assembly. In comparison, the HDPE blend of structure-2 (Example 6) did contact chill roll in the nip assembly. The results shows that the WVTR of structure-2 is ~14% higher than structure-1. By preventing contact of the HDPE blend directly with the chill roll, the quench rate of the nucleation agent/HDPE blend layer was slowed. The slower quench rate allowed for a greater crystallization content of the HDPE blend and thus a lower WVTR value.

HDPE blended with a nucleating agent is the preferred polymer material for a moisture barrier. Implementation of HDPE coating can lead to curl in the coated board. The inclusion of a PP layer is the preferred polymer material for providing stiffness to the substrate and making it less susceptible to curl.

U.S. Pat. No. 7,335,409, incorporated herein by reference, describes using HDPE on both sides of a paperboard substrate to reduce curl. The method requires equal amounts of HDPE on both sides which are not an efficient use of materials. Of course in the present invention, it has been found that the inclusion of a layer of polypropylene (PP) maybe included to reduce or eliminate board curl that results from the inclusion of a HDPE barrier layer. As seen in examples 5 and 6, the inclusion of a polypropylene or polypropylene blend on a side of the board opposite the HDPE blended layer can eliminate the resulting curl that otherwise exist without the inclusion of the PP layer. The inclusion of a PP layer provides for a substrate which will not curl by any polypropylene layer providing for a compensating "stiffening" force to the HDPE blend layer as extruded on the opposite layer of the paperboard.

As set forth in U.S. Pat. No 7,335,409, there are a variety of paperboard structures containing HDPE as a water vapor barrier layer. To the extent such structures utilize an extruded HDPE layer, any of the HDPE layers disclosed could be modified according to the present invention to have an effective amount of a nucleating agent added to the HDPE layer as described in the present invention. The inclusion of an effective amount of nucleating agent within a HDPE layer will serve to increase the crystalline structure of the extruded HDPE layer and thereby improve the water vapor barrier properties of the resulting substrate. In addition, the various oxygen barrier layers and other barrier layers disclosed in U.S. Pat. No. 7,335,409 can also be utilized in accordance with the teachings of the reference, as modified with the HDPE/nucleating agent barrier layer described in the present application.

As used herein, LDPE includes pure LDPE, LDPE and any ethylene acrylate copolymer blends, LDPE and ethylene vinyl acetate copolymer blend, LDPE and LLDPE blend and LDPE and elastomers/plastomer blends.

Figure 25:
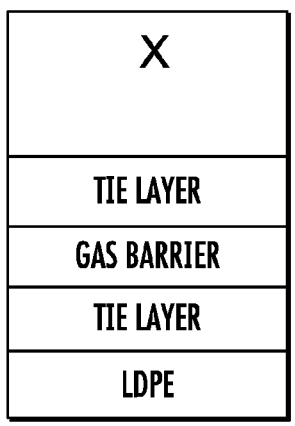

PP includes pure PP and blends of PP and LDPE. A preferred pure PP is PP homopolymer. Suitable moisture barrier structures including PP layers can be seen in reference to FIGS. 21-25. In reference to FIG. 25, the composition of layer "X" can include any combination of disclosed or referenced barrier boards set forth in the application that provides a moisture resistant barrier layer and with additional layers as indicated in FIG. 25 and which also provide for a gas barrier layer. The gas barrier layers may be applied as indicated to an interior board, in reference to a food contact surface of the resulting container constructed from the board. As disclosed herein, conventional tie layers cast barrier layers in a heat seal layer of LDPE may be utilized.

HDPE includes pure HDPE and HDPE blended with a nucleation agent. Preferred pure HDPE has a density ≥0.94 g/cm$^3$. It is also believed that the inclusion of a nucleating agent is described herein can be useful with a medium density polyethylene (MDPE), such MDPE having an density of between about 0.926 and about 0.940. Accordingly, the barrier structures set forth in U.S. Pat. No. 6,372,317 having LDPE or MDPE present as a water vapor barrier layer can have an effective amount of one of the nucleating agents described herein included in the respective LDPE or MDPE layers to bring about an improvement in the WVTR values with the substrate and any resulting food packaging made from the substrate. U.S. Pat. No. 6,372,317 is incorporated herein by reference.

These are advantages to having the HDPE with nucleation agents (blend) positioned as far away from the chill roll during the extrusion coating as possible, such as placing a LDPE layer between the HDPE and chill roll. The additional layer (s) will mitigate the rapid cooling of the nucleated HDPE and allow more time for the nucleation agent to take function.

A similar effect can also be achieved by using two extruders in tandem.

The nucleated HDPE is cooled down by the chill roll at the first station, and reheated as the web passes through the second station where the hot melt of an additional polymer layer is laid down on the already cooled HDPE surface. The nucleated HDPE is reheated to above the temperature where further crystallization and orientation, can proceed.

Gas barriers can also be used within the paperboard substrates and may include polymers such as amorphous polyamide (Grivory™, Selar™), polyamide such as nylon 6, nylon 66, MXD6, and ethylene vinyl alcohol polymers, and PET. The gas barrier can be a layer of a single polymer, polymer blend or multi-layers of multi-components.

Depending on the positions and adjacent materials, tie layers can be maleic anhydride grafted polyolefins, ethylene acrylate copolymers, ethylene acid copolymers, Ionomers, ethylene vinyl acetate copolymers, and ethylene alpha-olefin copolymers.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. An extruded paperboard laminate consisting of:
    a paperboard substrate having the first side and a second side;
    a first extruded layer of LDPE, extruded on to a first side of the paperboard layer;
    a layer of HDPE applied to the first layer, the HDPE layer further comprising a nucleating agent;
    a second extruded layer of LDPE applied the HDPE layer.

2. The laminate as defined in claim 1, wherein the HDPE layer and the LDPE layers are coated on the paperboard by a co-extrusion coating process or extrusion coatings in tandem.

3. The laminate as defined in claim 1, wherein the concentration of nucleation in the HDPE layer agent is between 500 ppm and 2500ppm following mixing in the extruder.

4. The laminate as defined in claim 2, wherein a melt temperature at an extrusion die is above 550° F. and below 650° F.

5. The laminate as defined in claim 1, wherein its WVTR is in the range of ~0 to 8 gm/m$^2$/day (~0 to .5 gm/100 in$^2$/day) at 100° F. and 90% RH measured with Mocon Permatran equipment for ASTM F1249-06.

6. The laminate as defined in claim 1, wherein the paper board is carton board, kraft board, solid bleached board, solid unbleached board, white lined chipboard, or container board.

7. The laminate as defined in claim 1, wherein the nucleation agent is selected from the group consisting of Group II metal salts of organic dibasic acids, calcium 1,2-cyclohexanedicarboxylate, organic pigments aromatic amide compounds and combinations thereof.

8. The extruded paperboard laminate according to claim 1, wherein the paperboard substrate has applied to a second side of the substrate an extruded layer of polypropylene.

9. The laminate as defined in claim 1, wherein the nucleation agent is selected from the group consisting of c-quinacridone, Cibantine Blue 2B, N,N'-dicyclohexyl-terephthalamide, N,N'-dicyclohexyl-2,6-naphthalene dicarboxamide, and combinations thereof.

10. An extruded paperboard laminate consisting of
    a paperboard substrate having the first side and a second side, the first side defining a food contact side;
    a first extruded layer of LDPE, extruded on to the first side of the paperboard layer;
    a layer of HDPE applied to the first layer of LDPE, the HDPE layer further comprising a nucleating agent; and
    a second extruded layer of LDPE applied the HDPE layer.

11. The extruded paperboard laminate according to claim 10, wherein the paperboard substrate has applied to a second side of the substrate an extruded layer of polypropylene.

* * * * *